March 30, 1965  J. W. ALBRECHT  3,175,665
ELECTROMAGNETIC FRICTION CLUTCH
Filed Feb. 15, 1962
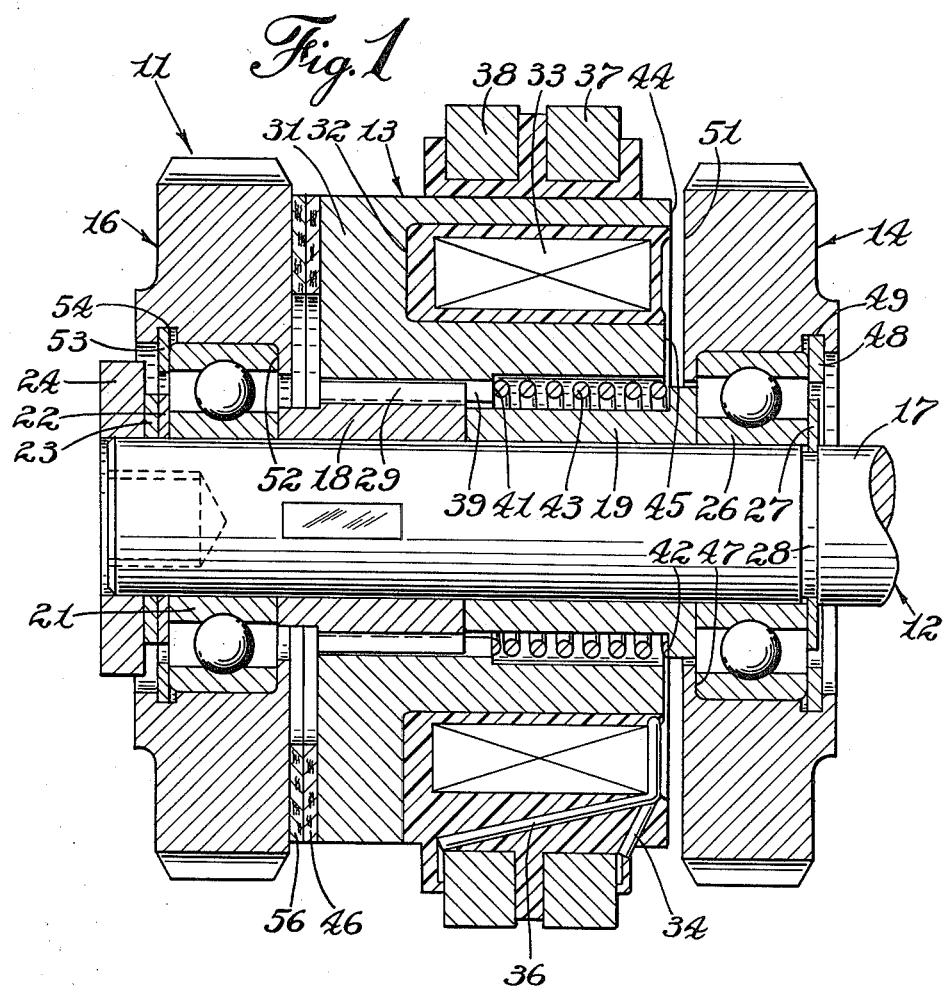
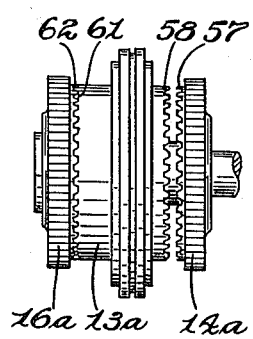
INVENTOR.
James W. Albrecht
ATTORNEY United States Patent Office 3,175,665
Patented Mar. 30, 1965

3,175,665
ELECTROMAGNETIC FRICTION CLUTCH
James W. Albrecht, Horseheads, N.Y., assignor to The Bendix Corporation, a corporation of Delaware
Filed Feb. 15, 1962, Ser. No. 173,477
4 Claims. (Cl. 192—84)

The present invention relates to a clutch and more particularly relates to an electromagnetic clutch adapted to alternatively join a driving member to one of two axially spaced driven members.

There are many applications for clutches which transmit torque from a single driving member to either one of two driven members. One such application exists in a present day office copying machine where a power shaft provides the driving member, and driven elements or mechanisms, axially spaced and journalled on the shaft, provide the driven members. The driving clutch mechanism, including a coil for creating an electromagnetic field, is slidably but non-rotatably supported on the shaft intermediate the driven members.

In the past, the driving clutch member has been actuated in a very cumbersome manner involving complicated mechanical linkages and externally mounted actuating solenoids. Such arrangements are extremely noisy as well as being difficult to adjust and maintain. Generally these prior art arrangements consist of a driving clutch member journalled on a power shaft between two axially spaced driven clutch members. The solenoid for actuating the driving clutch member is located externally of but adjacent to the clutch members and is operably connected to the driving clutch member by elaborate mechanical linkages including a shifting fork. The clutch driving surfaces are generally of the friction type. In this arrangement it is difficult to adjust the solenoid plunger action, the linkages, and the clutch axial travel so as to have the clutch friction linings forced together at the same moment the solenoid plunger is in its most ideal position within the solenoid. In the event the adjustment is improper, then the clutch will either not transmit its rated torque or the solenoid will develop an objectionable humming noise. In some copiers the clutch must drive the copy paper in synchronism with a lens and maintain the image and paper in absolute registry. If the clutch torque is erratic as a result of improper adjustments then proper registry between the image and paper will not be obtainable due to inconsistent acceleration of the paper. Another objectionable feature of the prior art is the fact that the solenoid and ancillary linkages are mounted directly on the frame of the utilized machine with the consequential result that the frame and cabinetry act as a sounding board to greatly magnify all operating noises. Lastly, the prior art type of clutches are costly to manufacture and operate for the simple reason that they incorporate this multitude of mechanical linkages. The cost of manufacture is further increased because of the need for elaborate adjustments resulting from the use of these linkages and actuating solenoid. Customer operating costs are unnecessarily high because of the propensities of these linkage arrangements to go out of adjustment.

It is an object of this invention to provide a clutch having a self-contained electromagnet for alternatively joining a driving member to one of two axially separated driven members.

It is another object of this invention to provide a self-contained electromagnetic-spring actuated clutch having a driving clutch body slidably but non-rotatably mounted on a power shaft intermediate axially separated driven clutch bodies journalled on the shaft and in which the energized electromagnet actuates the driving clutch member to establish a first driving relationship and the spring member actuates the driving clutch member when the electromagnet is deenergized to establish a second driving relationship.

It is a further object of this invention to provide an electromagnetic clutch which can be mounted independent of the supporting frame and cabinetry to eliminate objectionable noise magnifications.

It is a further object of this invention to provide a clutch which is relatively free from adjustments.

It is a further object of this invention to provide a clutch which, because it eliminates the need for complicated mechanical linkages and auxiliary components, has an improved torque to mass ratio and provides for more accurate and controllable operation.

The foregoing and other objects and advantages of this invention will appear more fully from a consideration of the detailed description which follows in conjunction with the accompanying drawing wherein one embodiment of this invention is illustrated. It is to be expressly understood, however, that the drawing is for the purpose of illustration and description and is not to be construed as defining the limits of this invention.

The following detailed description is in connection with the accompanying drawing, in which:

FIGURE 1 is a side view, in section, illustrating an electromagnetic clutch embodying the present invention; and FIGURE 2 is a side elevation on a reduced scale of a second embodiment of the present invention illustrating dentilled clutch driving surfaces.

Referring to the drawing, the clutch is generally designated 11 and comprises a driver element generally designated as 12, a driving clutch member generally designated as 13, and axially separated driven clutch members or elements generally designated as 14 and 16, respectively.

The driver element 12 is a rotatable power shaft 17 powered by a source not shown. An adaptor spline 18 is keyed to the shaft against rotational displacement and is maintained on the shaft against axial displacement being locked between a bushing 19 and the inner race of the bearing 21. The bearing is held against axial movement by washer means 22 and 23 and a retainer 24 of the utilizing equipment. The bushing 19 is secured against axial movement by the inner race of the bearing 26 which is in turn secured against axial displacement by the lock ring 27 seated in the groove 28 formed in the shaft. The adaptor has an increased diameter portion on which are formed circumferentially spaced axially extending splines 29.

The driving cluth member 13 comprises a substantially cylindrical magnet or driving cluth body 31. An annular cavity 32 opens to the right-hand extremity of the body as viewed in FIGURE 1. A coil 33 is supported within the cavity secured therein against movement by means of an epoxy resin or similar cementing means. Leads 34 and 36 connect the coil to axially elongated slip rings 37 and 38 carried by but insulated from the magnet body. The slip rings must have sufficient axial width and separation to accommodate the axial displacement of the clutch body without losing contact with sliding contact brushes (not shown). Axial splines 39 extending radially inwardly are formed adjacent the left-hand extremity of the magnet body. The splines 39 complement and are adapted to engage the splines 29 of the adaptor 18 thereby allowing the driving clutch body to be slidably but non-rotatably supported relative to the shaft. The splines 39 also provide a shoulder 41 facing in the direction of the bushing 19 and opposite to the shoulder 42 formed on the right-hand flanged extremity of the bushing. A coil compression spring 43 is supported on the bushing and has its extremities compressively engaging the shoulders 41 and 42.

The axial extremities of the clutch body 31 are formed to provide clutch driving surfaces. The right-hand extremity of the magnet body 31 is provided with a radial driving surface 44 adjacent the peripheral portions of the body radially outward of the coil cavity. In the instant invention the driving surface is a smooth metallic surface substantially perpendicular to the axis of the shaft.

The driven clutch member or body 14 is rotatably journalled on the shaft by the bearing 26. In the instant drawing the driven clutch body 14 is illustrated as a gear held against axial displacement relative to the supporting bearing by a shoulder 47 bearing against the bearing outer race on one side and a lock ring 48 seated in a groove 49 in the gear and bearing against the opposite side of the bearing outer race. It can be appreciated by those skilled in this art that the gear may be replaced by an adaptor or armature plate secured to the element or mechanisms to be driven. The face 51 of the driven clutch member 14 is smooth and substantially perpendicular to the shaft axis being adapted for engagement with the driving surface 44. The metal-to-metal driving engagement will transmit sufficient torque for office copier applications, but if desired, friction facing rings may be utilized as drive surfaces in a manner similar to that used between the magnet body 13 and the driven element 16 hereinafter described. It will be noted that the magnet body is recessed as at 45 to define the axially extending drive surface 44. The recess provides in the magnetic circuit a desirable air gap between the magnet body and the driven clutch body 16 to eliminate or reduce the effects of residual magnetism. Residual magnetism if sufficiently strong would cause the clutch members to remain engaged after the coil is de-energized and the electromagnetic field collapses. The drive surface 44 is located adjacent the radially outermost portion of the magnet body. The radial displacement of the drive surface is desirable in that it increases the mean friction radius and thereby improves the clutch torque transmitting characteristics.

The left-hand extremity of the driving clutch 31 supports a friction facing ring 46 of rubberized cork or comparable friction material. The facing 46 is secured to the magnet body by any convenient means such as by a thermosetting adhesive.

The driven clutch member or body 16 is also rotatably journalled on the shaft by means of the bearing 21. In the instant invention the driven clutch member is also illustrated as a gear held against axial displacement relative to the supporting bearing by a shoulder 52 bearing against the outer race of the bearing on one side and on the other side of the race by a lock ring 53 seated in a groove 54 in the gear. As previously suggested, the gear may be replaced by an adaptor or armature plate secured to the element or mechanisms to be driven. The driven clutch body 16 is provided with and supports a friction facing ring 56 of rubberized cork or comparable friction materials.

While the preferred invention has been described as having friction driving surfaces on the driving and driven clutch members, it should be understood that these surfaces, if necessary, may be formed as dentilled or toothed type surfaces to provide even greater torque transmitting capabilities. In FIGURE 2 the invention is illustrated as including dentilled clutch driving surfaces 57–58 and 61–62 between the driving clutch member 13a and the driven clutch members 14a and 16a, respectively.

In operation the shaft 17 is rotated by a power source (not shown). The first clutch body 31 by reason of the splined connection 29, 39 is rotated with the shaft but is axially movable relative thereto. Normally the coil 33 is not energized and consequently no electromagnetic field exists to create an electromagnetic attraction between the magnet or driving clutch body 13 and the driven clutch member 14. Under such circumstances, the compression spring 43 asserts a biasing force between the shoulders 41 and 42 to cause axial movement of the driving clutch body toward the driven clutch member 16. The friction facings 46 and 56, upon engagement, establish a driving connection between the driving clutch member 13 and the driven clutch member or element 16. Concomitantly, the driving relationship between the driving clutch member 13 and the driven clutch member or element 14 is disestablished.

When a current is applied to the coil 33 through the means of the slip rings 37 and 38 and the leads 34 and 36, the coil is energized and creates an electromagnetic field which establishes an electromagnetic attraction between the driving clutch body 13 and the driven clutch member 14. This magnetic attraction is of sufficient attractive force to overcome the bias of the spring 43 and causes the axial movement of the magnet body toward and into engagement with the member 14. The drive surface 44 of the magnet body engages the drive surface 51 of the member 14 and establishes a driving connection therebetween. Concomitantly, the driving relationship between the driving clutch 13 and the driven clutch member or element 16 is disestablished.

Because the entire clutch assembly is supported on the power shaft, the objectionable prior art features of having a portion of the clutch assembly secured to the frame or the cabinetry of the utilized machine is overcome, and in this simple but expedient manner objectionable noises and noise magnifications are eliminated. Also, because the clutch is small and efficiently compact, it will not be necessary to utilize troublesome actuating solenoids or mechanical linkages thereby providing an efficient operating unit which needs simple but infrequent adjustments. The clutch will possess a very favorable torque to mass ratio. This favorable ratio materially assists in obtaining more accurate and controllable clutch operation.

Although a single embodiment has been shown and described in the description and drawing, it will be understood that changes may be made in the design and arrangement of the parts without departing from the spirit of this invention.

I claim:

1. An electromagnetic clutch for alternatively joining a driving member to one of two axially spaced driven members, comprising a drive shaft;

a driving clutch body slidably but nonrotatably mounted thereon;

a first driven clutch body rotatably supported coaxial with the driving shaft adjacent to one axial extremity of the driving clutch body;

a second driven clutch body rotatably supported coaxial with the driving shaft adjacent to the other axial extremity of the driving clutch body;

yielding means for normally holding said driving clutch body in operative engagement with one of the driven clutch bodies; and means supported by one of said clutch bodies for generating an electromagnetic field to move said driving clutch body away from said one driven clutch body into engagement with the other driven clutch body to effect a driving connection therebetween.

2. An electromagnetic clutch as set forth in claim 1 in which:

said holding means is in the form of a spring mounted on the driving shaft and rotatable therewith, engaging the driving clutch body to bias it axially toward said one driven clutch body and normally maintain the operative engagement therebetween.

3. In an electromagnetic clutch assembly, a driving shaft;

a pair of radial and thrust bearings mounted thereon in axially spaced relation;

means preventing axial movement of said bearings away from each other;

an adapter sleeve keyed on the driving shaft adjacent one of said bearings;

a spacing bushing mounted on said shaft between the adapter sleeve and the other of said bearings;

a pair of driven clutch bodies rotatably mounted on said bearings;

a driving clutch member splined on the adapter sleeve between said driven clutch members;

yielding means normally maintaining the driving clutch member in operative engagement with one of the driven clutch members, and electromagnetic means operative, when energized, to move the driving clutch member away from said one driven clutch member and into operative engagement with the other driven clutch member.

4. An electromagnetic clutch as set forth in claim 3 in which said bushing is formed with a radial flange at one end, and said yielding means is in the form of a compression spring surrounding said bushing, bearing at one end against said flange, and it its other end against the ends of the splines in the driving clutch member.

References Cited by the Examiner
UNITED STATES PATENTS

| | | |
|---|---|---|
| 1,056,243 | 3/13 | Whitcomb. |
| 2,253,309 | 8/41 | Smellie. |
| 2,816,454 | 12/57 | Hosea, et al. |
| 3,070,200 | 12/62 | Gallas. |

DAVID J. WILLIAMOWSKY, *Primary Examiner.*

THOMAS J. HICKEY, *Examiner.*